(12) United States Patent
Zhou et al.

(10) Patent No.: US 12,071,980 B2
(45) Date of Patent: Aug. 27, 2024

(54) PLAIN BEARING HAVING COATED OUTER AND INNER RINGS

(71) Applicants: Aktiebolaget SKF, Gothenburg (SE); SKF Aerospace France S.A.S, Montigny-le-Bretonneux (FR)

(72) Inventors: Xiaobo Zhou, PV Houten (NL); Camille Dayot, Valence (FR); Arnaud Turmeau, Chabeuil (FR)

(73) Assignees: Aktiebolaget SKF, Gothenburg (SE); SKF AEROSPACE FRANCE S.A.S, Montigny-Lebretonneux (FR)

( * ) Notice: Subject to any disclaimer, the term of this patent is extended or adjusted under 35 U.S.C. 154(b) by 0 days.

(21) Appl. No.: 17/745,015

(22) Filed: May 16, 2022

(65) Prior Publication Data

US 2022/0381291 A1 Dec. 1, 2022

(30) Foreign Application Priority Data

May 26, 2021 (FR) ...................................... 2105466

(51) Int. Cl.
*F16C 33/12* (2006.01)
*F16C 23/04* (2006.01)
*F16C 33/04* (2006.01)

(52) U.S. Cl.
CPC .......... *F16C 33/125* (2013.01); *F16C 23/045* (2013.01); *F16C 33/043* (2013.01); *F16C 33/124* (2013.01)

(58) Field of Classification Search
CPC .... F16C 23/043; F16C 23/045; F16C 33/043; F16C 33/124; F16C 33/125
See application file for complete search history.

(56) References Cited

U.S. PATENT DOCUMENTS

| 7,648,282 B2 * | 1/2010 | Shore ...................... F16C 43/02 |
| | | 384/208 |
| 7,845,875 B2 * | 12/2010 | Julliere ................. F16C 33/121 |
| | | 403/135 |
| 2012/0114971 A1 * | 5/2012 | Andler ...................... B22F 7/06 |
| | | 428/650 |

(Continued)

FOREIGN PATENT DOCUMENTS

| CN | 201786925 U | 4/2011 |
| CN | 104763740 A | 7/2015 |

(Continued)

OTHER PUBLICATIONS

Translation of DE102014224310 obtained Jun. 30, 23.*

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

A plain bearing having an outer ring and an inner ring, the outer ring and the inner ring providing respectively an inner surface and an outer surface intended to cooperate with each other for the relative movement of the outer and inner rings, the inner surface of the outer ring and the outer surface of the inner ring each including a coating including at least one layer. The hardness of the coating on the inner surface of the outer ring is less than the hardness of the outer ring, and the hardness of the coating on the outer surface of the inner ring is greater than the hardness of the inner ring.

9 Claims, 1 Drawing Sheet

(56) References Cited

U.S. PATENT DOCUMENTS

| | | | |
|---|---|---|---|
| 2013/0033013 A1* | 2/2013 | Voisine | F16C 33/1095 |
| | | | 280/124.1 |
| 2014/0119681 A1 | 5/2014 | Braun et al. | |
| 2014/0254965 A1* | 9/2014 | Giegel | F16C 35/02 |
| | | | 384/129 |
| 2015/0111793 A1 | 4/2015 | Badrak | |

FOREIGN PATENT DOCUMENTS

| | | | |
|---|---|---|---|
| DE | 102014224310 | * | 9/2016 |
| EP | 2048389 A2 | | 4/2009 |
| FR | 1352247 A | | 2/1964 |
| FR | 2907468 A1 | | 4/2008 |
| GB | 2585123 A | | 12/2020 |
| GB | 2585834 A | | 1/2021 |

\* cited by examiner

[Fig 1]
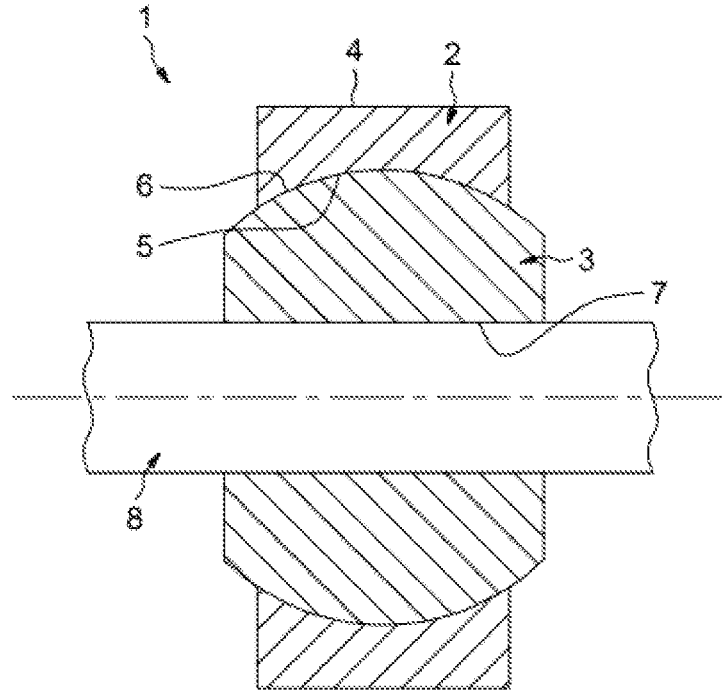
[Fig 2]
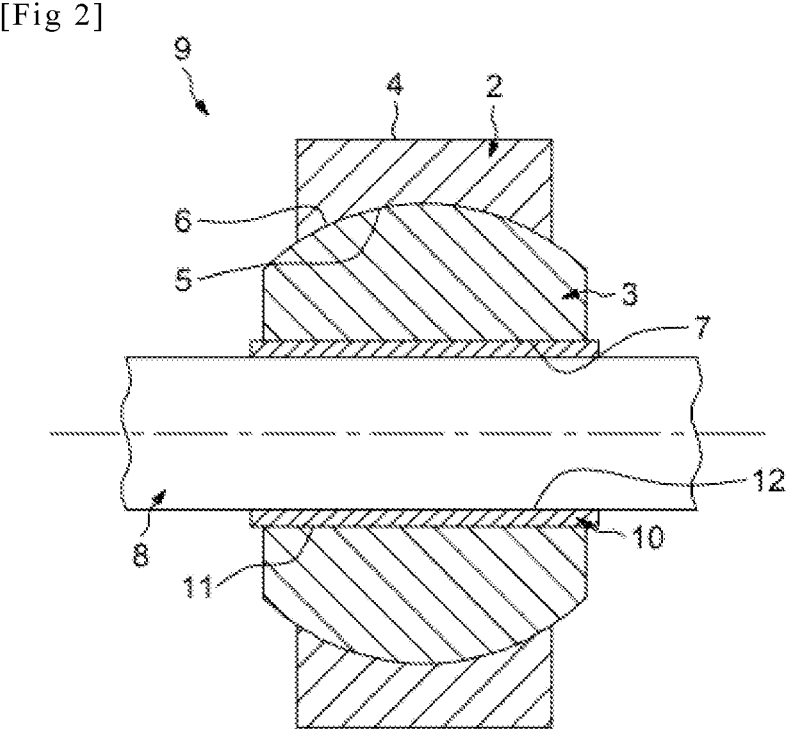

PLAIN BEARING HAVING COATED OUTER AND INNER RINGS

CROSS-REFERENCE TO RELATED APPLICATIONS

This application claims priority to French Patent Application no. 2105466, filed May 26, 2021, the contents of which is fully incorporated herein by reference.

TECHNICAL FIELD OF THE INVENTION

The present invention generally relates to plain bearings and more particularly to wear damage of plain bearings. In particular, the invention concerns coated outer and inner rings of plain bearings and a method of manufacture such plain bearings.

BACKGROUND OF THE INVENTION

Titanium alloy is 44% lighter than steel and 42 to 50% lighter than bronze, which make it very attractive for aerospace application, where the weight saving is important for fuel economy.

However, titanium alloy is chemically active and has high risk of seizure during tribological sliding contacts between titanium alloys or between titanium alloy and other alloys.

To solve this seizure problem, coatings are used and plain bearings made of coated titanium alloys are developed and used for landing gear and pylon applications.

The typical coating combinations are as follows: a hard coating applied by Physical Vapor Deposition (PVD) on both inner ring and outer ring raceways, or a soft thermal sprayed Cu based coating on inner ring raceway and a hard PVD coating on outer ring raceway. The bearings are grease lubricated, either with re-greasing or grease for life.

However, according to application experience and test results, there is still a risk of coating wear and delamination if the lubrication condition is not sufficient.

Indeed, for the contacts between hard-to-hard PVD coatings, the mating surface could not be conformed during run-in wear, and there will be always stress concentration on local contact areas, which will accelerate the wear and even cause coating delamination. Regarding the contacts between the soft coating of the inner ring and the hard coating of the outer ring, excessive wear on the inner ring near the edge of the outer ring, where the outer ring width is narrow compared with the inner ring, will cause edge loading and stress concentration, as well.

Consequently, the present invention intends to overcome these disadvantages by providing a plain bearing having inner and outer rings contacts optimized for wear reduction and to avoid risk of coatings delamination.

SUMMARY OF THE INVENTION

One object of the invention is to provide a plain bearing comprising an outer ring and an inner ring, the outer ring and the inner ring comprising respectively an inner surface and an outer surface intended to cooperate with each other for the relative movement of the outer and inner rings, the inner surface of the outer ring and the outer surface of the inner ring each comprising a coating including at least one layer.

Besides, the hardness of the coating on the inner surface of the outer ring is less than the hardness of the outer ring, and the hardness of the coating on the outer surface of the inner ring is greater than the hardness of the inner ring.

According to an embodiment, the coating on the inner surface of the outer ring may comprise at least one Cu based layer.

According to another embodiment, the coating on the inner surface of the outer ring may comprise at least one Tin based layer.

Advantageously, the thickness of the coating on the inner surface of the outer ring may be comprised between 20 and 2000 μm, preferably comprised between 100 and 300 μm.

According to an embodiment, the coating on the outer surface of the inner ring may comprise at least one diamond-like carbon layer.

According to another embodiment, the coating on the outer surface of the inner ring may comprise at least one CrN layer.

Advantageously, the thickness of the coating on the outer surface of the inner ring may be comprised between 1 and 50, preferably comprised between 1 and 25 μm.

Advantageously, the bore of the inner ring may comprise a coating having a hardness less than the hardness of the inner ring.

Advantageously, the plain bearing may comprise a metal bond layer located between the inner ring and the coating on the outer surface of the inner ring and/or a metal bond layer located between the outer ring and the coating on the inner surface of the outer ring.

Another object of the invention concerns a method of manufacture of a plain bearing comprising an outer ring and an inner ring, the outer ring and the inner ring comprising respectively an inner surface and an outer surface intended to cooperate with each other for the relative movement of the outer and inner rings, the method comprising applying a coating including at least one layer on the inner surface of the outer ring and applying a coating including at least one layer on the outer surface of the inner ring.

Besides, the hardness of the applied coating on the inner surface of the outer ring is less than the hardness of the outer ring, the hardness of the applied coating on the outer surface of the inner ring being greater than the hardness of the inner ring, and the coating of the inner surface of the outer ring being applied by a method selected from: laser cladding, thermal spraying and electrolytic plating.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the—present invention is not limited to the scaled drawings and that the illustrated proportions, scale, and relative positioning can be varied—without departing from the scope of the present invention as set forth in the broadest descriptions set forth in any portion of the originally filed specification and/or drawings. Other advantages and features of the invention will—appear from the detailed description of embodiments of the invention, which are non-limiting examples, illustrated on the appended drawing of which:

FIG. 1 is a sectional view of a plain bearing according to a first embodiment of the invention.

FIG. 2 is a sectional view of a plain bearing including a sleeve according to a second embodiment of the invention.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In the context of the present invention, the bounds of a value domain are included in this domain, especially in the expression "comprised between".

As shown in a first embodiment illustrated in FIG. 1, a plain bearing 1 generally comprises an outer ring 2 and an inner ring 3.

The illustrated plain bearing 1 is a metallic and spherical plain bearing and the inner ring 3 is wider than the outer ring 2. The outer and inner rings 2, 3 can be made of titanium alloy, steel or nickel alloy. As an example, the outer and inner rings 2, 3 can be made of TA6V or CRES steel.

The outer ring 2 comprises an outer surface 4 and an inner surface 5, and the inner ring 3 also comprises an outer surface 6 and an inner surface 7. In this example, the inner surface 7 forms the bore of the inner ring 3. The inner surface 5 of the outer ring 2 and the outer surface 6 of the inner ring 3 are intended to cooperate with each other for the relative movement of the outer and inner rings 2, 3. Besides, the inner surface 7 of the inner ring 3 is intended to cooperate with the axle 8 for the relative movement of the axle 8 and the inner ring 3.

The inner surface 5 of the outer ring 2 and the outer surface 6 of the inner ring 3 each comprises a coating including at least one layer.

In particular, the inner surface 5 of the outer ring 2 comprises a soft coating and the outer surface 6 of the inner ring 3 comprises a hard coating.

In the present invention, a soft coating is defined as a coating having a hardness less than the hardness of the coated material. On the contrary, a hard coating is defined as a coating having a hardness greater than the hardness of the coated material.

The hardness of the coating on the inner surface 5 of the outer ring 2 is less than the hardness of the outer ring 2. Besides, the hardness of the coating on the outer surface 6 of the inner ring 3 is greater than the hardness of the inner ring 3.

The combination of a soft coating and a hard coating, respectively, on the inner surface 5 of the outer ring 2 and on the outer surface 6 of the inner ring 3, prevents a risk of coating wear and delamination. Although the inner ring 3 is in motion with respect to the outer ring 2 and is wider than the outer ring 2, the hard coating on the outer surface 6 of the inner ring 3 allows to eliminate the edge load and stress concentration in sliding contact with the soft coating on the inner surface 5 of the outer ring 2.

Consequently, such a combination reduce the risk of seizure, extend the life of the plain bearing 1, 9 and maintenance interval.

Furthermore, in order to reduce the contact wear between the inner ring 3 and the axle 8, the inner surface 7 of the inner ring 3 can comprise a coating, preferably a soft coating.

The example shown on FIG. 2, in which identical parts are given identical references, differs from the first example in that the inner ring 3 of the plain bearing further comprises a sleeve 10. In this example, the inner ring is made in two parts.

The sleeve 10 includes an outer surface 11 intended to cooperate with the inner surface 7 of the inner ring 3 for the relative movement of the inner ring 3 and the sleeve 10, and an inner surface 12 intended to cooperate with the axle 8 for the relative movement of the axle 8 and the sleeve 10. In this example, the inner surface 12 of the sleeve forms the bore of the inner ring 3.

For example, the sleeve 10 can be made of bronze, steel or nickel alloy.

Furthermore, in order to reduce the contact wear between the sleeve 10 and the axle 8, the inner surface 12 of the sleeve 10 can comprise a coating, preferably a soft coating.

Soft Coating on the Outer Ring

Preferably, the soft coating of the inner surface 5 of the outer ring 2 is applied by a method selected from: laser cladding, thermal spraying and electrolytic plating, which allow to obtain a soft coating on an inner surface of a ring with high quality.

Advantageously, the thickness of the soft coating on the inner surface 5 of the outer ring 2 may be comprised between 20 and 2000 μm, preferably comprised between 100 and 300 μm.

According to an embodiment, the soft coating on the inner surface 5 of the outer ring 2 may comprise at least one Cu based layer.

In the present invention, a Cu based layer is defined as a layer having a copper content greater than other elements in the layer material.

According to an example, the Cu based layer may be applied on the inner surface 5 of the outer ring 2 by electroplating. The electroplating technique is based on an electrochemical process which allows applying a coating without shape limitation, and facilitates, in particular, applying a coating on the inner surface of a ring, without diameter limitation.

The Cu based layer applied by electroplating may comprise, as an example, 2 and 30 wt % of Sn, preferably 5 and 20 wt %, with a layer thickness preferably comprised between 100 and 300 μm and a hardness comprised between 100 and 200 HV.

According to another example, wherein the inner diameter of the outer ring 2 is preferably greater than 50 mm, more preferably greater than 80 mm, the Cu based layer may be applied on the inner surface 5 of the outer ring 2 by laser cladding or thermal spraying. A special design can be made on the laser cladding gun and thermal spraying gun to achieve an optimum quality for coating an inner surface of a ring.

The Cu based layer applied by laser cladding, thermal spraying may comprise Cu 50 and 90 wt % of C, 5 and 15 wt % of Al, 2 and 8 wt % of Ni, 1 and 7 wt % of Fe, and may have a hardness comprised between 50 and 400 HB, preferably comprised between 100 and 300 HB.

Alternatively, the Cu based layer applied by laser cladding, thermal spraying may comprise 70 and 90 wt % of Cu, 10 and 20 wt % of Ni, 5 and 12 wt % of Sn, and may have a hardness comprised between 50 and 400 HB, preferably comprised between 100 and 300 HB.

Alternatively, the Cu based layer applied by laser cladding, thermal spraying may comprise 70 and 90 wt % of Cu, 30 and 40 wt % of Ni, 2 and 8 wt % of In, and may have a hardness comprised between 50 and 400 HB, preferably comprised between 100 and 300 HB.

Alternatively, the Cu based layer applied by laser cladding, thermal spraying may comprise 70 to 90 wt % of Cu, 5 to 15 wt % of Al, 1 wt % of Fe, 1 to 4 wt % of graphite, and may have a hardness comprised between 50 to 400 HB, preferably comprised between 100 and 300 HB.

According to another embodiment, the soft coating on the inner surface 5 of the outer ring 2 may comprise at least one Tin based layer.

According to another example, wherein the inner diameter of the outer ring 2 is preferably greater than 50 mm, more preferably greater than 80 mm, the Tin based layer be applied on the inner surface 5 of the outer ring 2 by laser cladding or thermal spraying.

The Tin based layer may comprise 75 to 93 wt % of Sn, 5 to 15 wt % of Sb and 2 to 10 wt % of Cu and may have a hardness comprised between 20 and 40 HB.

Preferably, the thickness of the Tin based layer is comprised between 50 and 300 µm.

Furthermore, the plain bearing 1, 9 may comprise a metal bond layer located between the outer ring 2 and the soft coating on the inner surface 5 of the outer ring 2. Preferably, the metal bond layer thickness is comprised between 0.02 and 5 µm, more preferably comprised between 0.1 and 1 µm.

The metal bond layer may comprise Cr, Ti or Si.

According to another embodiment, the soft coating on the inner surface 5 of the outer ring 2 may comprise two layers.

For example, the soft coating on the inner surface 5 of the outer ring 2 may comprise a Tin based layer, preferably having a thickness comprised between 2 and 20 µm, located on top, and a Cu based layer, preferably having a thickness comprised between 100 and 300 µm, located on bottom.

Hard Coating on the Inner Ring

Preferably, the thickness of the hard coating on the outer surface 6 of the inner ring 3 may be comprised between 1 to 50, preferably comprised between 1 and 25 µm, in order to be sufficiently thick for preventing indentation damage in case of the presence of particles contamination. Such a thickness of the hard coating is particularly advantageous for prevents a break on the inner ring 3 made of titanium alloy which is a relatively soft material.

According to an example, the hard coating may be applied on the outer surface 6 of the inner ring 3 by physical vapor deposition (PVD).

According to an embodiment, the hard coating on the outer surface 6 of the inner ring 3 may comprise at least one diamond-like carbon (DLC) layer. The diamond-like carbon is a material particularly resistant to wear.

The tribological properties of the plain bearing 1, 9 are particularly optimal with the combination of an inner ring 3 hard coating comprising a diamond-like carbon layer in sliding contact with an outer ring 2 soft coating comprising a Cu based layer.

The thickness of the diamond-like carbon layer is preferably comprised between 1 and 20 µm, more preferably between 2 and 5 µm.

The diamond-like carbon layer can be a doped with metal. For example, the metal bond layer can comprise W, Ti, Si, Ni, preferably in a content of 3 to 20 wt %.

The hardness of the diamond-like carbon layer is, preferably, comprise between 800 and 5000 HV, more preferably 1200 and 2500 HV.

According to another embodiment, the hard coating on the outer surface 6 of the inner ring 3 may comprise at least one CrN layer.

The thickness of the CrN layer is preferably comprised between 1 and 50 µm, more preferably between 5 and 25 µm.

The hardness of the CrN layer is preferably comprised between 1000 and 2800 HV, preferably 1500 and 2300 HV.

Furthermore, the plain bearing 1, 9 may comprise a metal bond layer located between the inner ring 3 and the hard coating on the outer surface 6 of the inner ring 3. Preferably, the thickness of the metal bond layer is comprised between 0.02 and 5 µm, more preferably comprised between 0.1 and 1 µm.

The metal bond layer may comprise Cr, Ti or Si.

According to another embodiment, the hard coating on the outer surface 6 of the inner ring 3 may comprise two layers.

For example, the hard coating on the outer surface 6 of the inner ring 3 may comprise a diamond-like carbon layer located on top, and a CrN layer located on bottom.

Alternatively, the hard coating on the outer surface 6 of the inner ring 3 may comprise a diamond-like carbon layer located on top, and a metal bond layer located on bottom.

Soft Coating on the Inner Ring and the Ssleeve

Preferably, the soft coating of the inner surface 7 of the inner ring 3 and/or the inner surface 12 of the sleeve 10 is applied by a method selected from: laser cladding, thermal spraying and electrolytic plating.

Advantageously, the thickness of the soft coating on the inner surface 7 of the inner ring 3 and/or the inner surface 12 of the sleeve 10 may be comprised between 20 and 2000 µm, preferably comprised between 100 and 300 µm.

According to an embodiment, the soft coating on the inner surface 7 of the inner ring 3 and/or the inner surface 12 of the sleeve 10 may comprise at least one Cu based layer.

According to an example, the Cu based layer may be applied on the inner surface 7 of the inner ring 3 and/or the inner surface 12 of the sleeve 10 by electroplating.

The Cu based layer applied by electroplating may comprise, as an example, 2 and 30 wt % of Sn, preferably 5 and 20 wt %, with a layer thickness preferably comprised between 100 and 300 µm and a hardness comprised between 100 and 200 HV.

According to another example, wherein the inner diameter of the inner ring 3 and/or the inner diameter of the sleeve 10 is preferably greater than 50 mm, more preferably greater than 80 mm, the Cu based layer may be applied on the inner surface 7 of the inner ring 3 and/or the inner surface 12 of the sleeve 10 by laser cladding or thermal spraying. A special design can be made on the laser cladding gun and thermal spraying gun to achieve an optimum quality for coating the inner surfaces of ring and sleeve.

The Cu based layer applied by laser cladding, thermal spraying may comprise Cu 50 and 90 wt % of C, 5 and 15 wt % of Al, 2 and 8 wt % of Ni, 1 and 7 wt % of Fe, and may have a hardness comprised between 50 and 400 HB, preferably comprised between 100 and 300 HB.

Alternatively, the Cu based layer applied by laser cladding, thermal spraying may comprise 70 and 90 wt % of Cu, 10 and 20 wt % of Ni, 5 and 12 wt % of Sn, and may have a hardness comprised between 50 and 400 HB, preferably comprised between 100 and 300 HB.

Alternatively, the Cu based layer applied by laser cladding, thermal spraying may comprise 70 and 90 wt % of Cu, 30 and 40 wt % of Ni, 2 and 8 wt % of In, and may have a hardness comprised between 50 and 400 HB, preferably comprised between 100 and 300 HB.

Alternatively, the Cu based layer applied by laser cladding, thermal spraying may comprise 70 to 90 wt % of Cu, 5 to 15 wt % of Al, 1 wt % of Fe, 1 to 4 wt % of graphite, and may have a hardness comprised between 50 to 400 HB, preferably comprised between 100 and 300 HB.

According to another embodiment, the soft coating on the inner surface 7 of the inner ring 3 and/or the inner surface 12 of the sleeve 10 may comprise at least one Tin based layer.

According to another example, wherein the inner diameter of the inner ring 3 and/or the inner diameter of the sleeve 10 is preferably greater than 50 mm, more preferably greater than 80 mm, the Tin based layer be applied on the inner surface 7 of the inner ring 3 and/or the inner surface 12 of the sleeve 10 by laser cladding or thermal spraying.

The Tin based layer may comprise 75 to 93 wt % of Sn, 5 to 15 wt % of Sb and 2 to 10 wt % of Cu and may have a hardness comprised between 20 and 40 HB.

Preferably, the thickness of the Tin based layer is comprised between 50 and 300 μm.

Advantageously, the plain bearing 1, 9 may comprise a metal bond layer located between the inner ring 3 and the soft coating on the inner surface 7 of the inner ring 3, and/or a metal bond layer located between the sleeve 10 and the soft coating on the inner surface 12 of the sleeve 10.

The metal bond layer can be a doped metal. For example, the metal bon layer can comprise W, Ti, Si, Ni, preferably in a content of 3 to 20 wt %.

According to another embodiment, the soft coating on the inner surface 7 of the inner ring 3 and/or the inner surface 12 of the sleeve 10 may comprise two layers.

For example, the soft coating on the inner surface 7 of the inner ring 3 and/or the inner surface 12 of the sleeve 10 may comprise a Tin based layer, preferably having a thickness comprised between 2 and 20 μm, located on top, and a Cu based layer, preferably having a thickness comprised between 100 and 300 μm, located on bottom.

The invention claimed is:

1. A plain bearing configured for use within a ball joint having an axle, comprising:
   an outer ring and an inner ring, the outer ring and the inner ring comprising respectively an inner surface and an outer surface intended to cooperate with each other for the relative movement of the outer and inner rings, the inner surface of the outer ring and the outer surface of the inner ring each comprising a coating including at least one layer, the inner ring having a radially inner surface,
   the axle located radially inside the inner ring,
   a sleeve formed along the radially inner surface of the inner ring, the sleeve configured to slidingly contact the axle, wherein the sleeve comprises a sleeve coating,
   wherein the sleeve coating comprises a Copper based layer or a Tin based layer, and wherein
   the hardness of the coating on the inner surface of the outer ring is less than the hardness of the outer ring, and the hardness of the coating on the outer surface of the inner ring is greater than to the hardness of the inner ring.

2. The plain bearing according to claim 1, wherein the coating on the inner surface of the outer ring comprises at least one Cu based layer.

3. The plain bearing according to claim 1, wherein the coating on the inner surface of the outer ring comprises at least one Tin based layer.

4. The plain bearing according to claim 1, wherein the thickness of the coating on the inner surface of the outer ring is comprised between 20 and 2000 μm.

5. The plain bearing according to claim 1, wherein the coating on the outer surface of the inner ring comprises at least one diamond-like carbon layer.

6. The plain bearing according to claim 1, wherein the coating on the outer surface of the inner ring comprises at least one CrN layer.

7. The plain bearing according to claim 1, wherein the thickness of the coating on the outer surface of the inner ring is comprised between 1 and 50 μm.

8. The plain bearing according to claim 1, comprising a metal bond layer located between the inner ring and the coating on the outer surface of the inner ring or a metal bond layer located between the outer ring and the coating on the inner surface of the outer ring.

9. A method of manufacture of a plain bearing configured for use within a ball joint, comprising:
   providing an outer ring and an inner ring, the outer ring and the inner ring comprising respectively an inner surface and an outer surface intended to cooperate with each other for the relative movement of the outer and inner rings, the inner ring having a radially inner surface,
   providing an axle located radially inside the inner ring, the axle forming part of the ball joint,
   providing a sleeve formed on the radially inner surface of the inner ring, the sleeve being configured to slidingly contact the axle, wherein the sleeve comprises a sleeve coating,
   applying a coating including at least one layer on the inner surface of the outer ring and applying a coating including at least one layer on the outer surface of the inner ring,
   wherein the sleeve coating comprises a Copper based layer or a Tin based layer, and wherein
   the hardness of the applied coating on the inner surface of the outer ring is less than the hardness of the outer ring, the hardness of the applied coating on the outer surface of the inner ring being greater than the hardness of the inner ring, and the coating of the inner surface of the outer ring being applied by a method selected from: laser cladding, thermal spraying, and electrolytic plating.

* * * * *